May 23, 1961 — E. H. SHAMBLIN — 2,985,229

SAFETY HEAD CUSHION FOR AUTOMOBILES

Filed April 13, 1959 — 2 Sheets-Sheet 1

Ernest H. Shamblin
INVENTOR.

BY Clarence A. O'Brien
and Harvey B. Jacobson
Attorneys

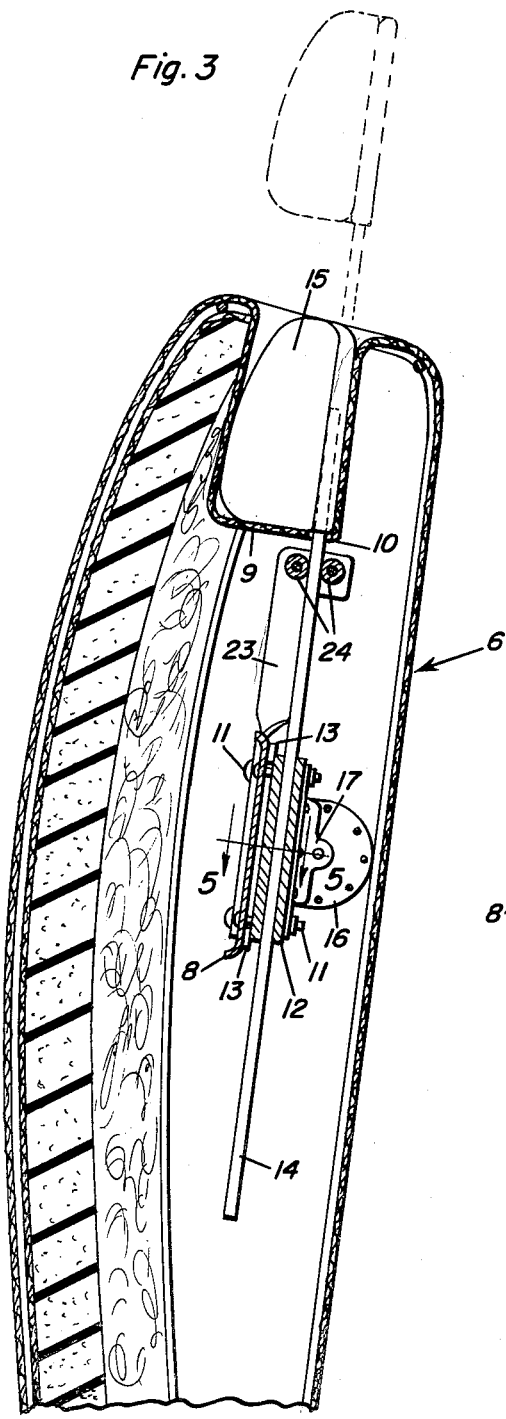
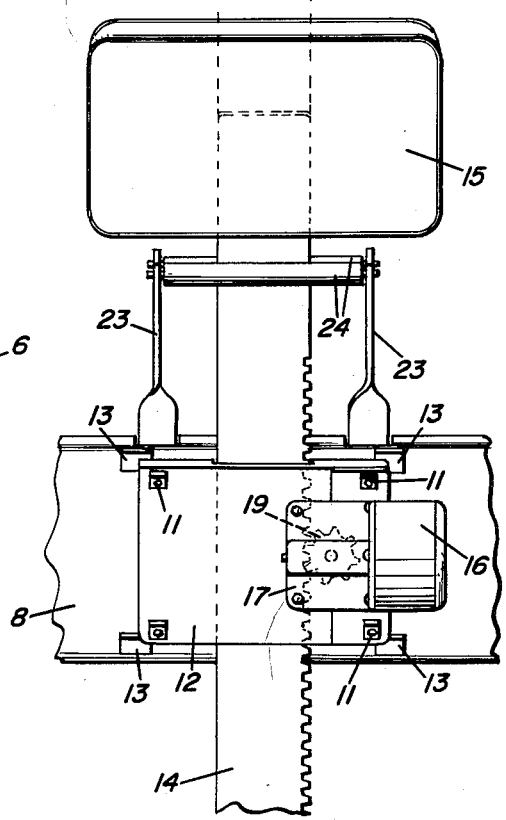

United States Patent Office 2,985,229
Patented May 23, 1961

2,985,229

SAFETY HEAD CUSHION FOR AUTOMOBILES

Ernest H. Shamblin, P.O. Box 1018, Bristow, Okla.

Filed Apr. 13, 1959, Ser. No. 805,786

5 Claims. (Cl. 155—177)

This invention relates to new and useful improvements in safety head cushions for automobiles and has for its primary object to provide novel means for preventing injury to the neck, spinal column, etc., by the force of inertia in the event of a rear end collision.

Another important object of the present invention is to provide a retractable safety head cushion of the character described which occupies a substantially concealed, out-of-the-way position in the back rest of the seat when it is not in use.

Still another important object of the invention is to provide, in a manner as hereinafter set forth, an automobile safety head cushion of the aforementioned character which is power operated.

Other objects of the invention are to provide a safety head cushion of the character set forth which will be comparatively simple in construction, strong, durable, compact, of light weight and which may be manufactured and installed at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged vertical sectional view, taken substantially on the line 3—3 of Figure 1;

Figure 4 is a view in rear elevation of the device; and

Figure 1:
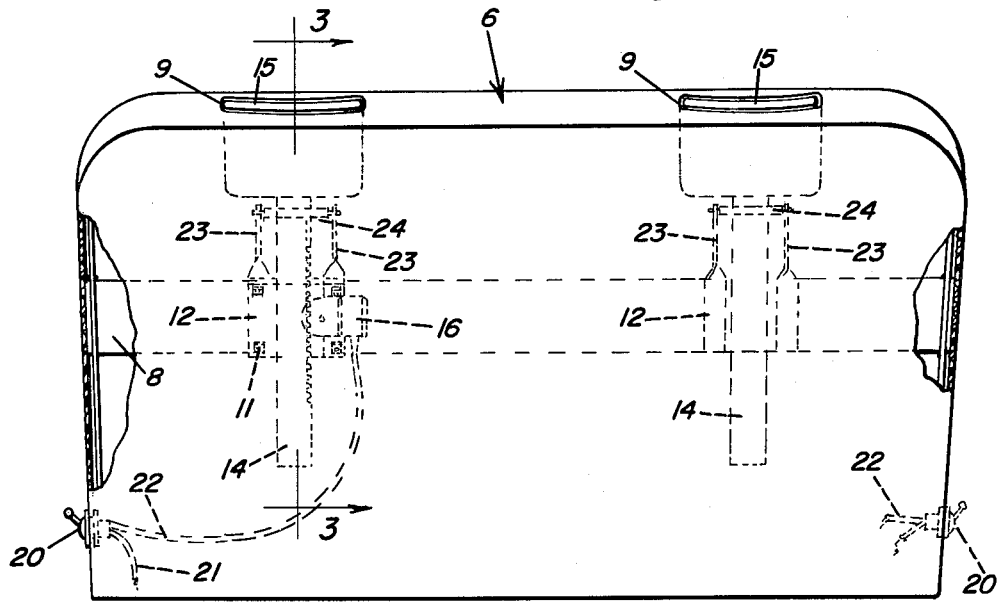
Figure 1 is a view in rear elevation, partially in section, of an automobile seat back rest equipped with a pair of safety head cushions embodying the present invention.

Referring now to the drawing in detail, it will be seen that reference character 6 designates generally the back rest of an automobile seat 7. In the installation shown, the back rest 6 is provided with a pair of safety devices embodying the present invention. As the two units are similar, a detailed description of one will suffice for both.

The back rest 6 comprises a frame structure which includes a crossbar 8. The top or upper portion of the back rest 6 has formed therein a depression or well 9 the bottom of which is provided with a slot 10.

Secured by bolts 11 on the rear of the crossbar 8 and aligned with the slot 10 is a guide 12 in the form of a substantially rectangular plate of suitable metal. Shims 13 between the crossbar 8 and the guide 12 permit adjustment of the latter. Slidably mounted in the guide 12 and operable in the slot 10 is a rack 14. Mounted on the upper end portion of the rack 14 and engageable, when in lowered or inoperative position in the well 9, is a cushion or pad 15 of suitable material.

Figure 5:
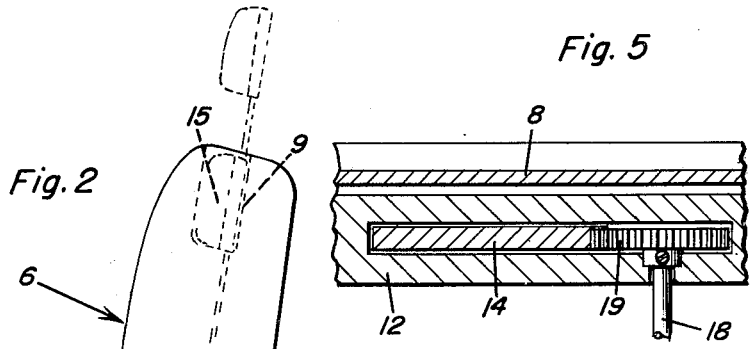
Figure 5 is an enlarged fragmentary view in horizontal section, taken substantially on the line 5—5 of Figure 3.
Figure 2:
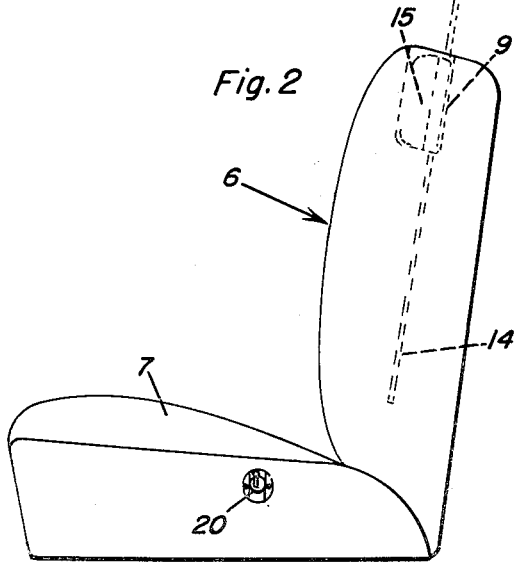
Figure 2 is a view in side elevation thereof, showing the cushion in raised or operative position.

Secured by a pair of the bolts 11 on the rear of the guide 12 is a reversible electric motor 16 having attached thereto a transmission 17. The transmission 17 drives a shaft 18 (see Figure 5) having fixed thereon a pinion 19 in the guide 12 which raises and lowers the rack 14.

Mounted on one end of the seat back 6 is a suitable reversing switch 20. Conductor wires 21 and 22 electrically connect the switch 20 to the usual storage battery of the vehicle and to the motor 16.

Secured on the front of the crossbar 8, also by the bolts 11, is a pair of upstanding arms or brackets 23. Rotatably mounted between the upper end portions of the brackets 23 is a pair of spaced rollers 24 between which the rack 14 travels, said rollers functioning as guides and braces for said rack.

It is thought that the use of the invention will be readily apparent from a consideration of the foregoing. Briefly, the cushion or pad 15 normally rests in the well 9 where it is substantially concealed from view. When approaching a congested or dangerous area the operator closes the switch 20 for actuating the electric motor 16 in a direction to elevate the cushion or pad 15 to substantially the position shown in broken lines in Figure 3 of the drawing. In this raised position the cushion 15 is directly in back of the head of the operator. Now, in the event of a rear end collision the elevated cushion 15 receives and supports the head and, in an obvious manner, prevents injury to the neck, spinal column, etc., by the force of inertia of "whip-lash." Of course, to retract or lower the cushion or pad 15 to inoperative position in the well 9, the electric motor 16 is simply reversed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A retractable automobile safety head cushion comprising: in combination, a vehicle seat back including a well in its upper portion, said well comprising a bottom having a slot therein, said seat back further including a rigid crossbar below the well, a vertical guide rigidly mounted on said crossbar and aligned with the slot, a rack slidable in the guide and operable in the slot, a pad rigidly mounted on the upper end portion of the rack for supporting the head against the force of inertia, a reversible electric motor mounted on the guide and operatively connected to the rack for elevating and retracting the pad, said pad, when in retracted position, reposing in the well, and a pair of opposed brace rollers for the rack mounted on the crossbar, said rollers being spaced vertically above the crossbar for supporting said rack.

2. A seat back assembly for vehicle seats comprising a seat back having a cushioned front surface, a rigid crossbar attached to said seat back in spaced relation to the cushioned front surface, a vertically disposed guide rigidly attached to said crossbar, an elongated rack slidably received in said guide, said rack being in the form of a rigid strap member having a rectangular transverse cross sectional area, gear teeth along one edge of said rack, a pinion gear disposed in the same plane as the rack and in meshing engagement with the teeth on the rack, a reversible electric motor mounted on said guide and drivingly engaged with pinion gear for extending and retracting said rack, a pad fixed rigidly to the upper end of said rack for vertical movement therewith, and roller stabilizing means mounted on said guide and engaging the rack in spaced relation to the guide, said guide and stabilizing means forming the sole means for supporting said rack.

3. A safety head cushion adapted for mounting on a vehicle seat, said seat comprising a seat back having a cushioned front surface and a rigid crossbar attached to the seat back in spaced relation to the cushioned front surface, said safety head cushion including a vertically disposed guide adapted for rigid attachment to the crossbar, an elongated rack slidably received in said guide, said rack being in the form of a rigid strap member having a rectangular transverse cross-sectional area, gear teeth along one edge of said rack, a pinion gear disposed in the same plane as the rack and in meshing engagement with the teeth on the rack, means mounted on said guide and drivingly engaged with the pinion gear for extending and retracting said rack, a pad fixed rigidly to the upper end of said rack for vertical movement therewith, and stabilizing means mounted on said guide and engaging the rack in spaced relation to the guide, said guide and stabilizing means forming the sole means for supporting said rack.

4. The structure as defined in claim 3 wherein said stabilizing means includes a pair of upwardly extending brackets rigid with the guides, and a pair of rollers mounted on said brackets and engaging opposed flat surfaces of the racks for rolling engaging the racks.

5. The structure as defined in claim 4 wherein said guide includes inner and outer plates slidingly engaging the flat surfaces of the rack, said guide including a generally vertical abutment engaging the edge of the rack in opposition to the pinion gear whereby the pinion gear serves to retain the rack against the guide for the opposite edge thereof.

References Cited in the file of this patent

UNITED STATES PATENTS

| | | |
|---|---|---|
| 2,158,183 | Hascham | May 16, 1939 |
| 2,466,553 | McDonald | Apr. 5, 1949 |
| 2,684,708 | Luketa | July 27, 1954 |